United States Patent [19]

Kesselman

[11] Patent Number: 4,883,295

[45] Date of Patent: Nov. 28, 1989

[54] TAMPER DETERRENT ASSEMBLY

[76] Inventor: David A. Kesselman, 5494 Winter Creek Rd., Santa Rosa, Calif. 95404

[21] Appl. No.: 106,360

[22] Filed: Oct. 9, 1987

Related U.S. Application Data

[63] Continuation-in-part of Ser. No. 773,079, Sep. 6, 1985, Pat. No. 4,699,408.

[51] Int. Cl.$^4$ .............................................. B65D 27/30
[52] U.S. Cl. .................................... 292/307 R; 70/440
[58] Field of Search ............ 292/307 R, 307 A, 307 B, 292/323, 324, 325, 326, 316, 317, 318, 319, 320, 321, 322; 70/440, 50, 455

[56] References Cited

U.S. PATENT DOCUMENTS

| | | | |
|---|---|---|---|
| 210,641 | 12/1878 | Smith et al. | 292/307 R |
| 327,783 | 10/1885 | Foote | 292/307 R |
| 783,047 | 2/1905 | Kachel | 292/318 |
| 930,227 | 8/1909 | Reister | 292/319 |
| 942,315 | 12/1909 | Elliott | 292/319 |
| 961,069 | 6/1910 | Crudginton | 292/319 |
| 1,324,566 | 12/1919 | Reich | 292/322 |
| 1,442,812 | 1/1923 | Littleworth | 292/318 |
| 1,866,461 | 7/1932 | Goschnick | 292/307 |
| 1,911,060 | 5/1933 | Clark | 292/325 |
| 2,003,755 | 6/1935 | Moore | 292/326 |
| 2,656,209 | 10/1953 | Conaway, Sr. | 292/319 |
| 2,988,391 | 6/1961 | Erke | 292/325 |
| 3,107,935 | 10/1963 | Erke | 292/325 |
| 3,206,814 | 9/1965 | Schumm | 292/325 |
| 3,955,842 | 5/1976 | Edwards | 292/307 R |
| 4,008,914 | 2/1977 | Anderson | 292/307 R |
| 4,049,313 | 9/1977 | Lundberg | 292/307 R |
| 4,062,090 | 12/1977 | Moolenaars | 292/307 R |
| 4,106,801 | 8/1978 | De Lima Castro Neto | 292/307 R |
| 4,107,959 | 8/1978 | Skarzynski et al. | 292/DIG. 11 |
| 4,112,990 | 9/1978 | Anderson | 292/307 R |
| 4,254,647 | 3/1981 | Finck | 70/77 |
| 4,262,946 | 4/1981 | Swisher | 292/307 R |
| 4,342,477 | 8/1982 | McClure | 292/307 R |
| 4,416,478 | 11/1983 | Canney | 292/307 R |
| 4,580,319 | 4/1986 | Paradis | 292/317 |
| 4,607,414 | 8/1986 | Six | 292/326 |
| 4,676,084 | 6/1987 | Signorelli | 70/440 |

FOREIGN PATENT DOCUMENTS

| | | | |
|---|---|---|---|
| 176176 | 9/1953 | Austria . | |
| 538186 | 3/1957 | Canada | 292/325 |
| 560557 | 7/1958 | Canada . | |
| 301440 | 10/1917 | Fed. Rep. of Germany | 292/307 R |
| 506618 | 8/1930 | Fed. Rep. of Germany | 292/317 |
| 176175 | 9/1953 | Fed. Rep. of Germany | 292/325 |
| 395533 | 3/1909 | France | 292/325 |
| 970463 | 1/1951 | France | 292/323 |
| 623367 | 7/1961 | Italy | 292/317 |
| 2051942 | 1/1981 | United Kingdom . | |

Primary Examiner—Gary L. Smith
Assistant Examiner—Eric K. Nicholson
Attorney, Agent, or Firm—Sixbey, Friedman, Leedom & Ferguson

[57] ABSTRACT

A tamper deterrent assembly which is molded of plastic material and includes a body member with an enclosed locking space having an open end. The open end is closed by a closure member mounted on the body member and movable toward a closed end of the locking space. The closure member is normally retained on the body member in a first position and may be moved to a locking position where a strip engaging unit carried by the closure member is received and locked by a locking unit. The locking unit may be carried by an elongated locking strip which is inserted into the locking chamber through a strip receiving slot in the body, or the strip engaging unit may pass through the locking strip and engage a locking unit carried on an end wall of the body.

22 Claims, 3 Drawing Sheets

TAMPER DETERRENT ASSEMBLY

This application is a Continuation-In-Part application of my copending application Ser. No. 773,079 entitled Tamper Deterrent Assembly which was filed on Sept. 6, 1985 now U.S. Pat. No. 4,699,408.

TECHNICAL FIELD

The present invention relates to tamper deterrent seals of the type usable on electric, gas and water meters, cabinets, bag, pouches and the like. In particular, the invention is directed to a new and improved assembly which will not only deter unauthorized opening of a locked enclosure, but will also provide a visual indication of actual or attempted unauthorized access to the enclosure.

BACKGROUND ART

All locking devices are subject to tampering, possibly resulting from loss of keys, duplication of keys, picking etc. Furthermore, in many instances, if visible signs of tampering do not exist, the fact that tampering has occurred may go unnoticed indefinitely. For example, utility meters are normally readable without access to the interior of the meter case so that, if tampering with the meter is unnoticeable, the fact that the meter case has been opened may go undiscovered. This is particularly true when barrel locks of the type conventionally used on meter boxes are improperly opened to expose the meter to tampering. At present, tamper protection for barrel locks involves periodically replacing the barrel lock mechanism, a solution which is both expensive and ineffective. Barrel locks, and other locks exposed to the environment, can become contaminated and problems with the proper functioning of the lock can occur, resulting in the need for the lock to be replaced. Similar problems can occur with respect to cash bags, mail pouches, computer cabinets, cable TV hookups and other secured enclosures that are situated in locations that are accessible to unauthorized persons. Thus, there is a need for a device which will not only provide a tamper deterrent seal for secured enclosures, but will also provide visible evidence of tampering. Secondarily, for lock arrangements that are exposed to the weather, a need exists for such a tamper deterrent seal that will, additionally, provide some weather protection for the lock mechanism.

Skarzynski et al U.S. Pat. No. 4,107,959 discloses a meter box guard lock wherein the box is locked through the use of a conventional barrel lock which is inserted into its locking position through a locking tube. In order to protect the lock from dirt and the weather, a plastic plug is inserted into the top end of the locking tube after the barrel lock has been secured in place. Furthermore, in order to deter tampering and efforts to pick the barrel lock, a conventional wire seal is threaded through a pair of diametrically opposed slots in the upper end of the locking tube and through a corresponding slot formed in the plastic plug. While this seal arrangement achieves some weatherproofing of the barrel lock, such an arrangement actually contributes to the possibility that tampering may be hidden. The wire seal can be shifted so as to enable the wire to be cut, and then the cut portion can be hidden within the slot of the plastic plug after tampering has been carried out and the meter box relocked and resealed.

In the Canney U.S. Pat. No. 4,416,478, a tamper deterrent seal providing an indication of tampering for watt hour meters is disclosed that provides a visual indication when an unauthorized attempt has been made to access the meter. That is, tampering will be visible because of the fact that the seal is constructed of a frangible material and has a head that is designed to readily fragment when placed under stress. While such a seal will provide adequate evidence of tampering, the construction disclosed by Canney requires that the meter box be specifically constructed for use with the tamper deterrent seal of that patent. Moreover, since this tamper deterrent seal of the Canney patent is a seal between housing components of the meter box, and not a seal disposed over the meter lock, itself, it can serve no weatherproofing function for the lock.

Although various other forms of protection for utility meters, such as padlock seals, lead and wire seals, dust caps, etc. exist on the market, all are either easily compromised and leave less than adequate evidence of tampering, require a special construction for the meter box itself and/or fail to provide weatherproofing for the lock. For example, Lundeberg U.S. Pat. No. 4,049,313 shows a plastic strip which extends through opposed slots in the collar of a barrel lock receiving bushing for a meter box. This strip fails to completely close the space within the collar.

In another environment, Anderson U.S. Pat. Nos. 4,112,990 and 4,008,914, as well as Moolenaars U.S. Pat. No. 4,062,090, all show reusable pouches having a zipper type closure and a sealing device for maintaining the zipper closed by holding the pull tab of the zipper in the position in which the zipper is closed. The seals of these patents include two parts, and expendable part and a reusable part mounted on the pouch. The expendable part is a button-like closure part that is engageable with the pouch-mounted reusable part and may only be removed from sealing engagement therewith by being broken, deformed or otherwise damaged so as not to be reusable. However, such pouch sealing arrangements require that the pouch be specifically manufactured with the reusable part of the seal as a part thereof, and this reusable part must have a complicated shape that is relatively costly to mold. Still further, since the portion of the button-like expendable part is hidden from normal inspection, it is possible to resecure a damaged button-like part (with something as simple as chewing gum) so that the fact that tampering has occurred will not be noticed until the pouch is re-opened. Alternatively, there is also the possibility that another, like, expendable button-like part might be utilized to reseal the pouch, if the tampering party has access to the same, since there is no means of determining that such a substitution has been made.

The latter-mentioned deficiency is overcome in the security seal and sealing system of Neto U.S. Pat. No. 4,106,801 by virtue of the fact that the breakable locking strip thereof is provided with an individual identification number. However, the locking strip of this patent requires that each of the two parts that are being secured together have one of a complex, molded cap and spool part attached thereto, thereby placing inherent limitations on the versatility thereof and significantly increasing the cost associated with use of the sealing system of that patent.

Lastly, padlock type seals, like conventional lead and wire type seals, are well known, and patents such as Foote U.S. Pat. No. 327,783 and Moore U.S. Pat. No.

2,003,753 show examples thereof. The seals of these patents use an elongated metal strip as a shackle, the ends of which are secured within a housing, after having been installed, and are designed such that it is impossible to remove the shackle ends from the housing without mutilation sufficient to indicate that the seal has been tampered with. However, the housing of the Foote patent is expensive to produce because it is formed of metal that must be cast about a pin that is used for securing the two ends of the shackle. Furthermore, fastening of the pin requires use of a punch or press to force the pin into the metal wall forming an opposite side of a slot for receiving the shackle ends. Similarly, even though the Moore patent does not require a punch or press for securement purposes, this seal is also expensive to produce due to the multipartite construction of the housing and the need to incorporate a rotatable member therein that is used to deform an end of the shackle strip after it has been inserted into the housing.

Thus, there is a need for a seal that can be serial numbered, leaves evidence of tampering, cannot be glued or replaced easily, is simple in construction and easy to install, while being universal in application and cost-effective. Furthermore, for outside applications, a seal that possesses the preceding characteristics and also affords weather protection for the lock is also desirable.

DISCLOSURE OF THE INVENTION

In accordance with the foregoing, it is an object of the present invention to provide a tamper deterrent assembly which will leave evidence of tampering.

It is a further object of the present invention to provide a tamper deterrent assembly which will be simple to install and versatile in its application.

It is yet another object in accordance with the present invention to provide a tamper deterrent assembly which is simple in construction and costeffective to produce and use.

Still another object in accordance with the present invention is to provide a tamper deterrent assembly which is capable of being serially numbered, and which is formed of plastic which cannot be bonded by gluing so that evidence of tampering cannot be repaired.

These and other objects of the present invention are implemented by providing a novel tamper deterrent assembly which comprises three interactive components. The first component is a body member having a wall means that circumferentially defines a locking space and which is provided with a pair of diametrically opposed slots extending through the wall means.

A second component is an elongated locking strip that has a first portion with a transverse cross-sectional size and shape that closely conforms to the perimetric size and shape of the opposed slots of the body member and is long enough to at least span the distance therebetween. Furthermore, the locking strip has a manually grippable portion for use in inserting the first portion into the slots of the wall means. The elongated locking strip is integrally connected to the body member so as to form the shackle of a padlock type seal.

The third component is a closure piece that is mounted for movement within the locking space and is sized for sealing an open end of the locking space of the body member. This closure piece is in the form of an open ended enclosure having a top wall and sidewall means extending from the top wall to define an open end. The closure piece has a perimetric contour of a size and shape that is axially insertable within the enclosing space of the body member without providing access between the wall means of the body member and the perimeter of the closure piece. Furthermore, a tang member projects from the top wall of the closure piece and is positioned in a location in alignment with a through-slot in the first portion of the locking strip when the closure piece is pushed inwardly into the receiving space of the body member and the first portion of the locking strip is inserted into the opposed slots.

The body member, the locking strip, and the closure piece are configured relative to each other so as to enable the closure piece, the body member and the locking strip to be interlocked in a manner preventing disengagement of the assembly without visible damage to at least one of the closure piece and the locking strip.

These and further objects, features and advantages of the present invention will become more obvious from the following description when taken in connection with the accompanying drawings which show, for purpose of illustration only, several embodiments in accordance with the present invention.

BEST MODE FOR CARRYING OUT THE INVENTION

Figure 1:
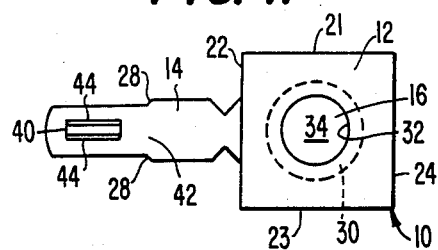
FIG. 1 is a plan view of a padlock seal type of tamper deterrent assembly of the present invention.
Figure 2:
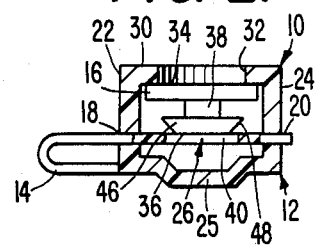
FIG. 2 is a cross-sectional view of the padlock seal of FIG. 1.

FIGS. 1 and 2 illustrate a basic padlock type seal embodying the concepts of the present invention. This padlock seal embodiment, designated generally by the reference numeral 10, has three basic components, a body member 12 having wall means defining a locking space, a locking strip 14, and a closure piece 16. The locking strip 14 is integrally joined with the body member 12 at one end, with an opposite end being left free. The free end of locking strip 14 is receivable in slots 18 and 20 formed in opposite walls 22 and 24 of the body member 12. To ensure proper positioning of a locking strip 14 in the slots 18 and 20 so that it can receive a tang 26, formed on closure piece 16, optional shoulders 28 may be provided which engage the wall 22 on either side of the slot 18. Alternatively, particularly for use on wires as a sealing cable tie, optional ratchet teeth may also be provided, in which case, no shoulders 28 should be formed on the locking strip.

Closure piece 16 is a button-like member which preferably is retained within the body member 12. For example, as illustrated in FIGS. 1 and 2, the body member 12 has sidewalls 21, 22, 23 and 24 which, with a bottom wall 25 form the enclosed body member 12. These sidewalls may include an inwardly extending rim 30 at the uppermost extremity thereof which defines an opening 32 in the body member 12. This rim retains the closure piece 16, but permits access to a disc-like portion 34 thereof so that pressure applied to the closure piece will lock the locking strip into place within the body member 12 when the locking strip is positioned in the manner illustrated by FIG. 2. The tang 26 includes an enlarged head 36 which extends from a projecting stem 38 formed integrally with the disc-like portion 34, and which will move downwardly through a locking slot 40 in the locking strip 14 to retain the locking strip within the body member 12. Obviously, the rim 30 could be eliminated and the closure piece 16 could operate as a piece separate from the body member 12, but this is not as convenient as retaining the closure piece within the body member.

It should be noted that the locking strip 14 has a shank section 42 of a transverse cross-sectional size and shape that closely conforms to the perimetric size and shape of the slots 18 and 20 in the body member 12. This enables the shank section to be slidably inserted into the slots with very little clearance existing between the periphery of the shank section and the surrounding wall defining the slot openings.

The shank section 42 of the locking strip 14 is provided with the longitudinally extending locking slot 40 which extends therethrough, and preferably the sidewalls 44 of the slot are beveled inwardly toward each other from one surface of the shank section 42 toward the opposite surface. Thus, as illustrated in FIG. 1, the slot 40 is wider adjacent the upper surface of the shank section illustrated than it is at the opposite surface of the shank section.

Tang member 26 projects centrally from a major face of the disc-like portion 34 and is formed with the enlarged head portion 36 and the stem portion 38. The length of the stem portion is slightly longer than the thickness of the shank section 42 of the locking strip 14, and the maximum perimeter of head portion 36 is designed to be slightly larger than the minimum perimeter of the locking slot 40 formed in the shank section. Thus, pressure may be applied to the top surface of the disc-like portion so as to force the head portion of tang member 26 through the slot 40 so that it latches onto the area surrounding the slot upon emergence from the slot. In this regard, to facilitate insertion of a head portion 36 that is greater in size than the perimetric size of the slot 40, the sidewalls 44 of the slot are inclined or beveled and the head portion is of a truncated, pyramid shape with sidewalls 46 having a slope matched to that of slot sidewalls 44. Also, the end walls 40 of the head portion are beveled. Once the tang is secured through the slot 40, it cannot be removed without breakage of the closure piece 16.

Additionally, in order to ensure visible evidence of a tampering attempt, it is advantageous that the closure piece 16 be formed of a frangible plastic that will break easily when pried or stressed. Conversely, the body member 12 including the shank section 42 of the locking strip 14, and generally the complete locking strip, is formed from a more flexible, nonfrangible plastic than is the closure piece so that the slot 40 will expand to receive the head portion of the tang member 26 and will then close against the stem portion 38.

Figure 3:
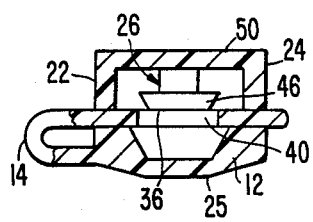
FIG. 3 is a cross-sectional view of a second embodiment of a padlock seal tamper deterrent assembly.

FIG. 3 shows a modification of the padlock seal 10 of FIGS. 1 and 2 wherein the disc-like portion 34 of the closure piece 12 is eliminated and the tang member 26 is formed on a top wall 50 of the body member 12. Top wall 50, with the bottom wall 25 and the sidewalls 21, 22, 23 and 24 provides a completely enclosed body member 12. The top wall 50 is formed of flexible plastic or similar flexible material so that pressure applied to the center portion thereof will cause the head 36 of the tang 26 to pass through the locking slot 40 in the locking strip 14 when the locking strip is positioned as shown in FIG. 3.

Figure 7:
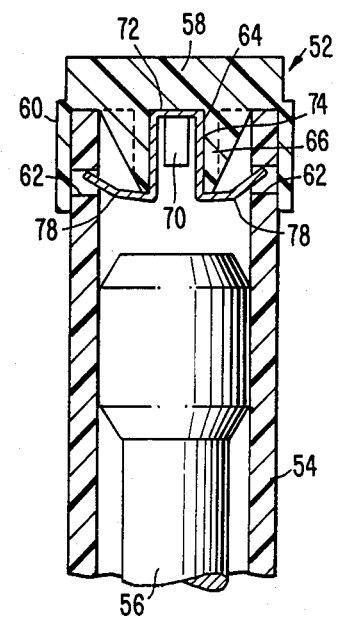
FIG. 7 is a cross-sectional view of the tamper deterrent assembly of FIGS. 4-6 in place in a ferrule lock tube.
Figure 4:
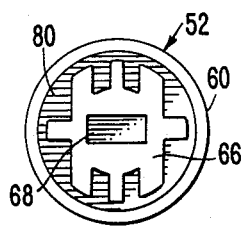
FIG. 4 is a plan view of the button of a closure piece for a third embodiment of the tamper deterrent assembly of the present invention.
Figure 5:
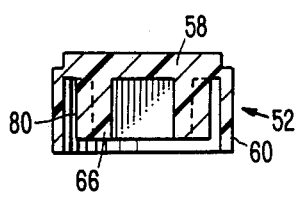
FIG. 5 is a cross-sectional view of the closure piece of FIG. 4.

FIGS. 4–7 illustrate an embodiment in accordance with the present invention wherein a closure piece 52 has a cap-shaped design to telescopically fit over the end of a ferrule lock tube 54 for a conventional barrel lock 56. The cap-shaped closure piece is formed with a thick top wall 58 and a thin circumferential wall 60 which will overlap opposed slots 62 formed in the wall of the ferrule lock tube. There are no corresponding slots in the circumferential wall. Furthermore, in this embodiment, a locking strip 64 is formed of a "U"-shaped member of spring metal and is mounted to the closure piece 52 so as to be carried thereby. For this purpose, the closure piece is provided with an integral locking strip support section 66 which projects inwardly from the top wall 54 in spaced relationship to the circumferential wall 60. This locking strip support section includes a central recess 68, and the locking strip is deformed in its central portion so as to hold itself in the recess 68 under an expansive spring action as shown in FIG. 7. This securing action can be further complimented by forming the locking strip with laterally extending, inclined fingers 70 which wedge themselves against walls of the recess 68 and dig into these walls to prevent removal of the locking strip from the recess. These fingers extend upwardly and are inclined outwardly from a central leg 72 which extends between spaced legs 74 of the "U"-shaped locking strip.

Figure 6:
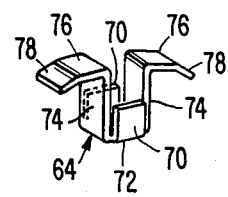
FIG. 6 is a perspective view of a spring metal locking strip for insertion in the closure piece of FIGS. 4 and 5.
Figure 8:
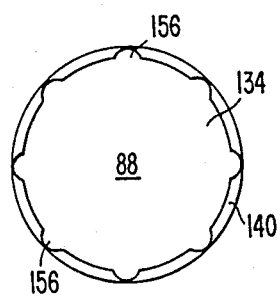
FIG. 8 is a plan view of a closure member for a padlock seal which is a fourth embodiment of the tamper deterrent assembly of the present invention.
Figure 9:
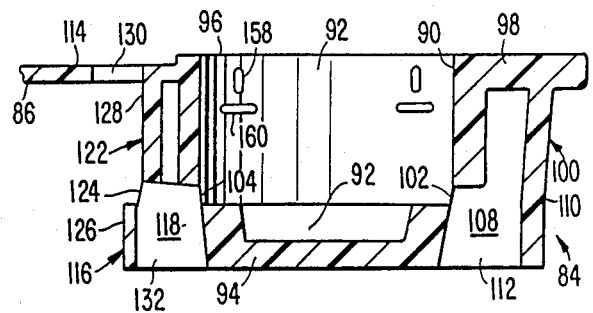
FIG. 9 is a cross-sectional view of the body member for the tamper deterrent assembly which receives the closure member of FIG. 8.
Figure 10:
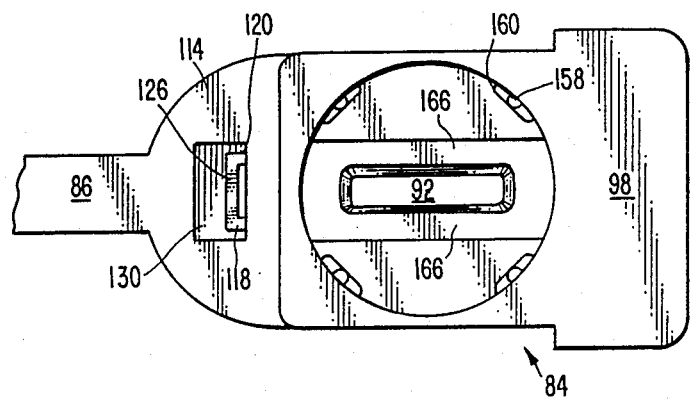
FIG. 10 is a top plan view of the body member of FIG. 9.
Figure 11:
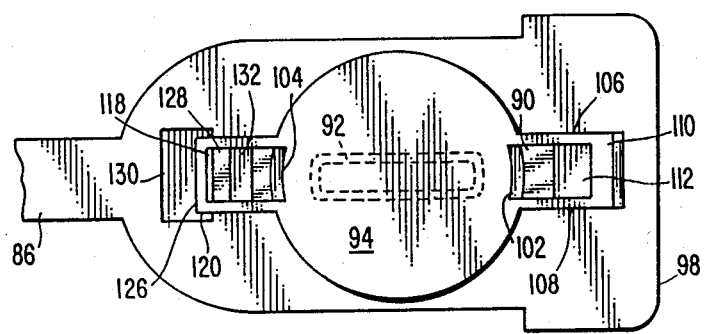
FIG. 11 is a bottom plan view of the body member of FIG. 9.

The locking strip 64 is provided with hook-like wing portions 76 that extend outwardly and then curve angularly downward from the upper extremity of each leg 74 as shown in FIG. 6. When the web 72 and the legs 74 of the locking strip are inserted into the central recess 68, the terminal ends 78 of the wing portions 76 project radially into the space 80 between the circumferential wall 60 and the locking strip support section 66. Then, when the closure piece 52 is pressed down onto the rim of the ferrule lock tube 54, the rim of the ferrule lock tube will displace the hook-like wing portions 76 radially inwardly as it moves into the circumferential space 80. Once the ferrule lock tube is fully inserted into the space 80, the terminal ends 78 of the wing portions 76, when brought into alignment with the diametrically opposed slots 62 of the ferrule lock tube, will spring radially outwardly into the slots, thereby interlocking the closure piece 52 locking strip 14 and ferrule lock tube 54 together as shown in FIG. 7. The closure piece 52 is formed of frangible plastic material which will fracture, should someone try to pry the closure piece off of the ferrule lock tube, thereby providing physical evidence of tampering. The thicker and stronger top wall 58 and locking strip support section 66 ensures that the thinner circumferential wall 60 is the first to fracture.

FIGS. 8-12 disclose a padlock seal 82 of the general type shown in FIGS. 2 and 3 having enhanced protective features which positively defeat all efforts to conceal tampering. The padlock seal 82, like the previously described devices, includes three basic components, namely, a body member 84, an elongated locking strip 86 and a closure piece 88. The body member is molded integrally with one end of the locking strip, and both may be formed of any thermoplastic material that is strong, resists ultraviolet radiation, and is non-glueable. Several flexible, non-frangible plastics are suitable for use in molding the body member and locking strip, such as polypropylene or nylon.

The body member 84 includes a sidewall 90 which defines a locking space 92. The lower end of the locking space is closed by a bottom wall 94 which extends across the locking chamber and is joined to the lower end of the sidewall 90. The upper end of the locking space is open, as indicated at 96, to receive the closure piece 88.

Extending outwardly from one side of the sidewall 90 at the upper end thereof is a flat tab section 98, and extending downwardly from this tab section is a shielding assembly 100. This shielding assembly encloses a first slot 102 of two opposed slots 102 and 104 formed in the sidewall 90 on opposite sides of the locking chamber 92. The shielding assembly includes two spaced sidewalls 106 and 108 which extend outwardly from the sidewall 90 on either side of the slot 102 and between the tab section 98 and the bottom wall 94. An end wall 110 spaced from the sidewall 90 is connected to the sidewalls 106 and 108 to form a closed shielding assembly having an open viewing port 112 adjacent to the bottom wall 94.

Opposite to the tab section 98 and extending outwardly from the top of the sidewall 90 is a flat locking strip support section 114 which curves inwardly to the integrally formed locking strip 86. The locking strip support section forms the top wall for an entry shielding assembly 116 which encloses the slot 104. This entry shielding assembly includes two sidewalls 118 and 120 spaced on either side of the slot 104 which extend outwardly from the sidewall 90 and downwardly from the flat locking strip support section 114 to the bottom wall 94. The sidewalls 118 and 120 are bridged by a sectional end wall 122 having a slot 124 which is aligned with the slot 104. Below the slot 124, the end wall 122 has a lower section 126 which is positioned outwardly from the upper section 128 of the end wall which extends above the slot 124 to the flat locking strip support section 114. The lower sections of the sidewalls 118 and 120 also extend outwardly below the slot 124 to the lower section 126 of the end wall 122, and thus form an entrance ramp for the locking strip 86 to guide the locking strip into the slots 124, 104 and 102. A viewing window 130 is formed in the flat locking strip support section 114 to permit the locking strip to be observed as it passes through the slot 124. Also, the bottom of the entry shielding section 116 is open to provide an observation port 132 to permit the locking strip to be observed as it passes through the slot 104.

The closure piece 88 is formed of frangible plastic, such as styrene or plexiglas (acrylic) and the closure piece is cap-shaped in configuration. A top wall 134 joins a sidewall 136 to define an open ended inner chamber 138 for the closure piece. The sidewall terminates at a lateral flange 140 which extends annularly around the open end of the inner chamber. The lower edge of this flange is angled or chamfered outwardly toward the top wall of the closure piece as indicated at 142.

Formed integrally with the top wall 134 of the closure piece 88 and extending downwardly therefrom into the inner chamber 138 is a support pedestal 144 having a central cavity or channel 146. Secured within this central cavity by sonic welding, gluing, or other means is the shaft 148 of a metal locking pin 150. This shaft extends outwardly from the support pedestal beyond the confines of the sidewall 136, and terminates at an enlarged head 152. This head extends outwardly beyond the shaft 148 and has a sidewall 154 which tapers downwardly and inwardly toward the terminal end of the head.

The flange 140 of the closure piece 88 is formed to slide within the locking space 92 but to engage and closely conform to the shape of the inner surface of the sidewall 90. Similarly, the sidewall 136 of the closure piece closely conforms to the shape of the inner surface of the sidewall 90 and is spaced only a minute distance therefrom by the width of the flange 140. However, this distance is bridged by a plurality of spaced vertical ribs 156 which extend outwardly from the sidewall 136 between the flange 140 and the top wall 134. These ribs project outwardly for a distance equal to the width of the flange, and engage the sidewall 90 when the closure piece is inserted into the locking space 92.

Figure 12:
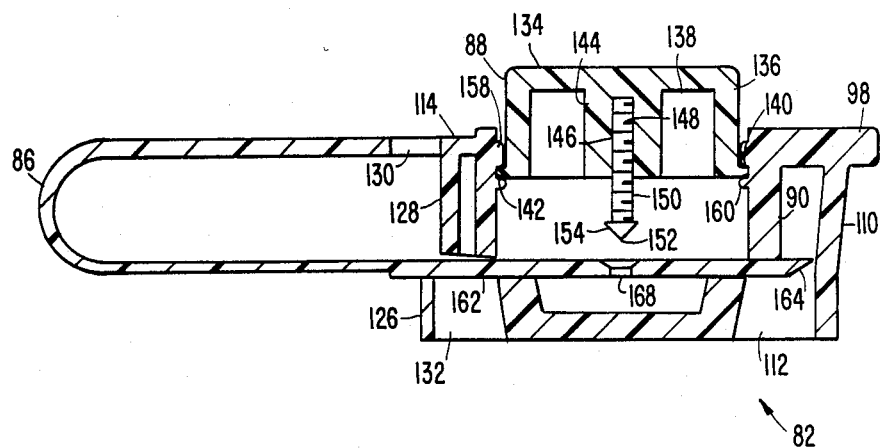
FIG. 12 is a cross-sectional view of an assembled tamper deterrent assembly including the closure member of FIG. 8 and the body member of FIG. 9.

To hold the closure piece 88 in an unlocked position within the locking space 92, spaced, projecting snap tabs 158 and 160 are formed on the sidewall 90. When the closure piece is inserted into the locking space, the angled edge of the flange 140 can be forced over the upper snap tabs 158 into engagement with the lower snap tabs 160. The upper snap tabs now engage the upper surface of the flange to hold the closure piece in assembled relationship with the body member 84. The top wall of the closure piece will be positioned outwardly from the body member as illustrated in FIG. 12.

To lock the padlock seal 82, the free end of the locking strip 86 is inserted through the slots 124, 104 and 102. It will be noted that the free end of the locking strip is thicker than the remainder of the locking strip for a distance from the terminal end thereof which exceeds the width of the body member 84. This forms a relatively rigid locking section 162 at the end of the locking strip which is tapered outwardly at the terminal end 164 thereof to aid in the insertion of the locking strip into the body member. The locking section is guided into locking position by the end wall section 126, the slots 124 and 104, and spaced guides 166 which project upwardly from the bottom wall 92 to the lower edge of the slots 104 and 102.

Once the locking section 162 engages the end wall 110, a locking aperture 168 formed therein is positioned directly beneath the head 152 of the locking pin 150. The aperture 158 is tapered with the widest portion uppermost, so that when the head of the locking pin is forced into the aperture, the locking section 162 expands to permit the head to pass through and then the aperture snaps closed around the shaft 148 behind the head. It is now impossible to withdraw the head from the locking section of the locking strip.

To lock the locking strip, pressure is applied to the top wall 134 of the closure piece 88 to force the flange 140 over the lower snap tabs 160. Now the closure piece can be moved inwardly of the locking space 92 until the head 152 of the locking pin passes through the locking aperture 168. At this point, the top wall 134 of the closure piece will be substantially in line with the top surfaces of the flat tab section 98 and the locking strip support section 114. If the locking strip is pulled or pried, the thicker support pedestal 144 will not break but will apply force to the thinner frangible top wall 134 which will break to provide evidence of tampering.

Figure 13:
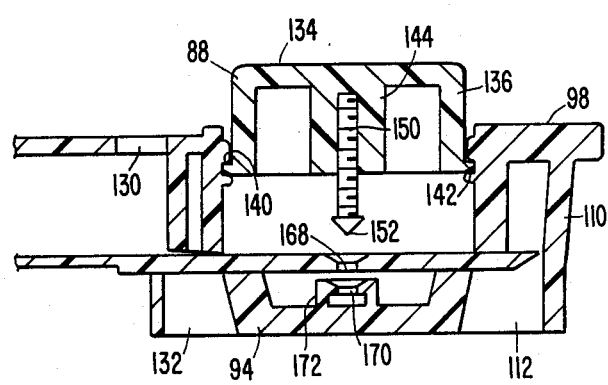
FIG. 13 is a cross-sectional view of a padlock seal forming a fifth embodiment of the tamper deterrent assembly of the present invention.

FIG. 13 discloses a padlock seal which is identical to the seal of FIG. 12, but which includes a double locking feature. Here, a second locking aperture 170, which is identical in shape and function to the locking aperture 168, is mounted in alignment therewith on the bottom wall 94. The locking aperture 170 is formed in a pedestal 172 which spaces this second locking aperture above the bottom wall 94 so that the head 152 can pass through this second locking aperture. Obviously, the locking aperture 168 in the locking section 162 can be replaced by an aperture large enough to receive the head 152 without locking, and the locking of the head would now occur solely in the locking aperture 170.

Industrial Applicability

The tamper deterrent assembly is an all thermoplastic injection molded seal comprising a lock body and a locking button or cap. The lock body is injection molded out of a non-frangible non-glueable, flexible thermoplastic, such as polypropylene or nylon, while the cap is molded out of a dissimilar thermoplastic that is frangible, such as U.V. stabilized styrene or acrylic. Both the lock body and the cap are designed to be hot stamped or indelibly printed upon to add to their security, and the cap and body will contain variations of numbers and/or symbols that will make mixing of parts impossible once a record of the installed tamper deterrent assembly is made.

The tamper deterrent assembly provides a low cost, non-conductive, long term seal that is easy to install, readily noticeable if tampered with, and highly resistant to U.V. degradation and gluing. The device may be effectively used to seal electric, gas and water meters, truck cargo doors, liquor and other cabinets, cable T.V. installations, mail bags and other installations where a tamper evident seal is required.

I claim:

1. A tamper deterrent assembly comprising:
    a body member having wall means defining a locking space which is enclosed except for an open end thereof, first and second strip receiving means formed on said wall means in opposed relationship on opposite sides of said locking space and in spaced relationship to the open end of said locking space, at least said first strip receiving means being formed by a slot which extends through said wall means to provide an opening to said locking space,
    a closure means having a locking strip engagement means projecting outwardly therefrom;
    mounting means formed on said body member for retaining said closure means within said locking space and releasably retaining said closure means in a first position wherein said locking strip engagement means is spaced from said first and second strip receiving means in the direction of the open end of said locking space, said closure means being operative to prevent access to said locking space through the open end thereof and being movable from said first position relative to said wall means into said locking space in the direction of said first and second strip receiving means in response to pressure applied to said closure means sufficient to release said closure means from said mounting means, said closure means being freely movable to a locking position after said release, and
    an elongated locking strip including a first portion of a length greater than the distance across said locking space between said first and second strip receiving means, said first portion being formed for insertion into the slot forming said first strip receiving means so as to extend across said locking space to said second strip receiving means and including receiver means operative to receive said locking strip engagement means when the first portion of said elongated locking strip is inserted through the slot forming said first strip receiving means and extends across said locking space into said second strip receiving means and said closure means is moved from said first position to move said locking strip engagement means past said first and second strip receiving means to a locking position, said closure means being positioned in said locking space completely within the confines of said wall means when said locking strip engagement means is in the locking position.

2. The tamper deterrent assembly of claim 1 wherein said wall means includes inner sidewall means extending completely around said locking space to define the perimeter thereof, said inner sidewall means including an upper edge at the open end of the locking space to define an opening which is closed by said closure means, and a bottom wall means extending between said inner sidewall means to close the locking space at an end thereof opposite to said open end, said closure means including a cap-like assembly having a cap top wall and cap sidewall means connected at one end to said cap top wall to define an open ended central chamber, said locking strip engagement means being mounted on said cap top wall and projecting outwardly from the open end of said central chamber, said cap top wall being positioned either substantially within the plane of said upper edge or between said upper edge and said bottom wall when said locking strip engagement means is in the locking position.

3. The tamper deterrent assembly of claim 2, wherein said cap-like assembly is formed of frangible plastic material, said body member and elongated locking strip being formed of plastic material which is more flexible and less frangible than the plastic material forming said cap-like assembly.

4. The tamper deterrent assembly of claim 2, wherein said cap-like assembly includes mounting means formed integrally with said cap top wall to mount said locking strip engagement means thereon, said cap-like assembly being formed of frangible plastic material with said cap top wall being formed to have less resistance to force than said mounting means and locking strip engagement means.

5. The tamper deterrent assembly of claim 1, wherein said wall means includes inner sidewall means defining the perimeter of said locking space and the open end thereof, a bottom wall means secured to said inner sidewall means and closing the locking space at an end thereof opposite to said open end, said first and second strip receiving means being formed on said inner sidewall means, and outer shielding means spaced from said inner sidewall means and extending in superimposed relationship over both said first and said second strip receiving means.

6. The tamper deterrent assembly of claim 5, wherein said first and second strip receiving means are diametrically opposed first and second slots extending through said inner sidewall means on opposite sides of said locking space, said inner sidewall means extending completely around said locking space and including a continuous upper edge defining said open end, said first and second slots being spaced between said upper edge and said bottom wall means.

7. The tamper deterrent assembly of claim 2, wherein said cap-like assembly includes a cap flange wherein said cap-like assembly includes a cap flange extending outwardly from said cap sidewall means at the end thereof opposite to said cap top wall, said mounting including flange engagement means positioned between said first and second strip receiving means and the open end of said locking space, said flange engagement means operating to engage said cap flange to retain said closure means in said first position within aid locking space and to release said flange in response to pressure applied to said cap top wall to permit said closure means to move to said locking position.

8. The tamper deterrent assembly of claim 7, wherein said cap-like assembly includes spaced ribs projecting from said cap sidewall and extending in a direction between said flange and cap top wall.

9. The tamper deterrent assembly of claim 8, wherein said flange includes a bevelled edge in engagement with said flange engagement means when said closure means is in said first position.

10. The tamper deterrent assembly of claim 9, wherein said cap-like assembly is formed of frangible plastic material and includes mounting means formed integrally with said cap top wall to mount said locking strip engagement means thereon, said cap top wall being formed to have less resistance to force than said mounting means and locking strip engagement means, said body member and elongated locking strip being formed of plastic material which is more flexible and less frangible than the plastic material forming said cap-like assembly.

11. The tamper deterrent assembly of claim 10, wherein said locking strip engagement means includes a tang member projecting from said closure means and said receiver means is formed by a locking opening extending through the first portion of said locking strip, said tang member having a terminal end surface and at least one sidewall which slopes outwardly from said terminal end surface to provide said tang member with a perimetric dimension which is greater than that of said locking opening.

12. The tamper deterrent assembly of claim 11, wherein said tang member includes an end section which includes said terminal end surface and outwardly sloping sidewall and a stem section extending between said end section and said closure means, said end section having a cross-sectional dimension which is greater than that of said stem section at the point of joinder therebetween, the stem section projecting from said closure means for a distance sufficient to permit said stem section, when inserted in said locking opening, to extend completely therethrough when said closure means is moved to the locking position.

13. The tamper deterrent assembly of claim 12, wherein said locking opening is bordered by beveled surfaces for facilitating the insertion of said tang member.

14. The tamper deterrent assembly of claim 13, wherein said locking strip includes said first portion and a second portion extending outwardly from said first portion and having an end remote from said first portion which is fixed to said body member, said first portion being thicker and of less flexibility than said second portion.

15. The tamper deterrent assembly of claim 1, wherein said wall means includes sidewall means defining the perimeter of said locking space and a bottom wall means extending across one end of said locking space opposite the open end thereof between said sidewall means to close the end of said locking space, and locking means mounted upon said bottom wall means within said locking space, said locking means being adapted to receive and interlock with said locking strip engagement means when said locking strip engagement means is moved to said locking position.

16. The tamper deterrent assembly of claim 1, wherein said closure means at least partially extends outwardly through the open end of said locking space beyond the confines of said wall means when said closure means is in said first position.

17. A tamper deterrent assembly comprising:
a body member having wall means defining a locking space which is enclosed except for an open end thereof, said wall means including inner sidewall means extending completely around said locking space to define the perimeter thereof, said inner sidewall means including an upper edge at the open end of the locking space, and a bottom wall means extending between said inner sidewall means to close the locking space at an end thereof opposite to said open end, first and second strip receiving means formed on said inner sidewall means in opposed relationship on opposite sides of said locking space and in spaced relationship to the open end of said locking space, at least said first strip receiving means being formed by a first slot which extends through said inner sidewall means to provide an opening to said locking space,
said wall means further including outer shielding mean spaced from said inner sidewall means and extending in superimposed relationship over said first and second strip receiving means,
a closure means having a locking strip engagement means projecting outwardly therefrom, said closure means being mounted within said locking space in a first position wherein said locking strip engagement means is spaced from said first and second strip receiving means in the direction of the open end of said locking space, said closure means being operative to prevent access to said locking space through the open end thereof and being movable from said first position relative to said inner sidewall means in the direction of said bottom wall in response to pressure applied to said closure means, and
an elongated locking strip including a first portion of a length greater than the distance across said locking space between said first and second strip receiving means, said first portion being formed for insertion into the slot forming said first strip receiving means so as to extend across said locking space to said second strip receiving means and including receiver means operative to receive said locking strip engagement means when the first portion of said elongated locking strip is inserted through the slot forming said first strip receiving means and extends across said locking space into said second strip receiving means and said closure means is moved from said first position to move said locking strip engagement means past said first and second strip receiving means to a locking position.

18. The tamper deterrent assembly of claim 17, wherein said outer shielding means includes a first shielding assembly means extending outwardly from said inner sidewall means over said first slot to form an enclosed chamber having an open end adjacent to said bottom wall means, said first shielding assembly means having a second slot spaced from and aligned with said first slot and said second strip receiving means to receive the first portion of said elongated locking strip.

19. The tamper deterrent assembly of claim 18, wherein said second strip receiving means is a second slot said outer shielding means includes a second shielding assembly means extending outwardly from said inner sidewall means over said second slot to form an enclosed chamber having an open end adjacent to said bottom wall means.

20. A tamper deterrent assembly comprising:
a body member having wall means defining a locking space which is enclosed except for an open end thereof, said wall means including inner sidewall means extending completely around said locking space and defining the perimeter thereof and an opening at the open end of said locking space, said inner sidewall means including continuous upper edge around said opening, and bottom wall means extending between said inner sidewall means to close the locking space at an end opposite to said open end thereof, first and second strip receiving means formed on said receiving means formed on said inner sidewall means in opposed relationship on opposite sides of said locking space and in spaced relationship to the open end of said locking space to provide an opening to said locking space, said first and second strip receiving means including diametrically opposed first and second slots extending through aid inner sidewall means on opposite sides of said locking space, said first and second slots being spaced between said upper edge of said inner sidewall means and said bottom wall means, and outer shielding means spaced from said inner sidewall means and extending in superimposed relationship over at least one of said strip receiving mean, said outer shielding means including a first shielding assembly means extending outwardly from said inner sidewall means over said first slot to form an enclosed chamber having an open end adjacent to said bottom wall means, said first shielding assembly means having a third slot spaced from and aligned with said first and second slot,
a closure means having a locking strip engagement means projecting outwardly therefrom, said closure means being mounted within said locking space in a first position wherein said locking strip engagement means is spaced from said first and second strip receiving means in the direction of the open end of said locking space, said closure means being operative in said first position to prevent access to said locking space through the open end thereof and being movable relative to said wall means in the direction of said first and second strip receiving means in response to pressure applied to said closure means, and
an elongated locking strip including a first portion of a length greater than the distance across said locking space between said first and second strip receiving means, said first portion being formed for insertion into the third slot and the first slot forming said first strip receiving means so as to extend across said locking space to said second strip receiving means and including receiver means operative to receive said locking strip engagement means when the first portion of said elongated locking strip is inserted through the slot forming said first strip receiving means and extends across said locking space into said second strip receiving means and said closure means is moved from said first position to move said locking strip engagement means past said first and second strip receiving means to a locking position.

21. The tamper deterrent assembly of claim 20, wherein said outer shielding means includes a second shielding assembly means extending outwardly from said inner sidewall means over said second slot to form an enclosed chamber having an open end adjacent to said bottom wall means.

22. A tamper deterrent assembly comprising:
a body member having wall means defining a locking space which is enclosed except for an open end thereof, first and second strip receiving means formed on said wall means in opposed relationship on opposite sides of said locking space and in spaced relationship to the open end of said locking space, at least said first strip receiving means being formed by a slot which extends through said wall means to provide an opening to said locking space, and flange engagement means mounted on said wall means between said first and second strip receiving means and the open end of said locking space,
a closure means having a locking strip engagement means projecting outwardly therefrom mounted within said locking space in a first position wherein said locking strip engagement means is spaced from said first and second strip receiving means in the direction of the open end of said locking space, said closure means being operative in said first position to prevent access to said locking space through the open end thereof and being movable from said first position relative to said wall means in the direction of said first and second strip receiving means in response to pressure applied to said closure means, the closure means including a cap-like assembly formed of frangible plastic material having a cap top wall, cap sidewall means connected at one end to said cap top wall to define an open ended central chamber, a cap flange extending outwardly from said cap sidewall means at the end thereof opposite to said cap top wall, said cap flange including a bevelled edge in engagement with said flange engagement means when said closure means is in the first position, spaced ribs projecting from said cap sidewall and extending in a direction between said flange and cap top wall, and mounting means formed integrally with said cap top wall to mount said locking strip engagement means thereon, the locking strip engagement means projecting outwardly from the open end of said central chamber, said cap top wall being formed to have less resistance to force than said mounting means and locking strip engagement means, and an elongated locking strip including a first portion of a length greater than the distance across said locking space between said first and second strip receiving means, said first portion being formed for insertion into the slot forming said first strip receiving means so as to extend across said locking space to said second strip receiving means and including receiver means operative to receive said locking strip engagement means when the first portion of said elongated locking strip is inserted through the slot forming said first strip receiving means and extends across said locking space into said second strip receiving means and said closure means is moved from said first position to move said locking strip engagement means past said first and second strip receiving means to a locking position, said flange engagement means operating to engage said cap flange to retain said closure means in said first position within said locking space and to release said flange in response to pressure applied to said cap top wall to permit said closure means to move to said locking position, said body member and elongated locking strip being formed of plastic material which is more flexible and less frangible than the plastic material forming said cap-like assembly.

* * * * *